(12) United States Patent
Donna

(10) Patent No.: US 11,632,453 B2
(45) Date of Patent: Apr. 18, 2023

(54) GRIPPING ACCESSORY FOR PORTABLE ELECTRONIC DEVICES, GRIPPING ACCESSORY GROUP, ACCESSORY ASSEMBLY AND METHOD

(71) Applicant: Marco Donna, Rome (IT)

(72) Inventor: Marco Donna, Rome (IT)

( * ) Notice: Subject to any disclaimer, the term of this patent is extended or adjusted under 35 U.S.C. 154(b) by 46 days.

(21) Appl. No.: 17/342,329

(22) Filed: Jun. 8, 2021

(65) Prior Publication Data

US 2022/0353359 A1    Nov. 3, 2022

(30) Foreign Application Priority Data

Apr. 28, 2021    (IT) .......................... 102021000010745

(51) Int. Cl.
| | |
|---|---|
| *H04M 1/02* | (2006.01) |
| *A45C 11/00* | (2006.01) |
| *A45C 13/10* | (2006.01) |
| *A45F 5/00* | (2006.01) |
| *H04B 1/3888* | (2015.01) |

(52) U.S. Cl.
CPC ........... *H04M 1/0279* (2013.01); *A45C 11/00* (2013.01); *A45C 13/1069* (2013.01); *A45F 5/00* (2013.01); *H04B 1/3888* (2013.01); *A45C 2011/002* (2013.01); *A45C 2011/003* (2013.01); *A45C 2200/15* (2013.01); *A45F 2200/0516* (2013.01); *A45F 2200/0525* (2013.01)

(58) Field of Classification Search
CPC ...... H04M 1/0279; H04M 1/04; H04M 1/026; A45C 11/00; A45C 13/1069; A45C 2200/15; A45C 2011/003; A45C 2011/002; A45F 5/00; A45F 2200/0525; A45F 2200/0516; H04B 1/3888

See application file for complete search history.

(56) References Cited

U.S. PATENT DOCUMENTS

| | | | |
|---|---|---|---|
| 10,244,854 B1 * | 4/2019 | Haber | .................... H04B 1/385 |
| 10,962,169 B1 * | 3/2021 | White | .................... F16M 13/04 |
| 2018/0348541 A1 | 12/2018 | Radzwill | |
| 2020/0326030 A1 | 10/2020 | Surani et al. | |

FOREIGN PATENT DOCUMENTS

| | | |
|---|---|---|
| AU | 2019100586 A4 | 7/2019 |
| WO | WO-2020091903 A1 * | 5/2020 |

OTHER PUBLICATIONS

Partial English translation of Italian Search Report for related Italian Patent Application No. 102021000010745, dated Jan. 26, 2022, 17 pages.

* cited by examiner

*Primary Examiner* — Keith Ferguson
(74) *Attorney, Agent, or Firm* — Armstrong Teasdale LLP

(57) ABSTRACT

A gripping accessory for a portable electronic device or for a case of a portable electronic device including a base body having an upper surface, a lower surface, and a side wall is provided. The side wall has a left housing and a right housing suitable for being grasped by a respective finger of a user's hand. A first magnetic element is joined to the base body near the lower surface and is suitable for generating a magnetic field to keep the lower surface stably coupled with the portable electronic device or case. A second magnetic element, different from the first magnetic element, is joined to the base body near the side wall or upper surface. The second magnetic element is suitable for generating a magnetic field suitable for coupling with an auxiliary accessory including magnetic or ferromagnetic material.

4 Claims, 5 Drawing Sheets

GRIPPING ACCESSORY FOR PORTABLE ELECTRONIC DEVICES, GRIPPING ACCESSORY GROUP, ACCESSORY ASSEMBLY AND METHOD

CROSS-REFERENCE TO RELATED APPLICATION

This application claims priority to Italian Patent Application No. 102021000010745 filed on Apr. 28, 2021, the entire contents of which are hereby incorporated in its entirety by reference

FIELD OF THE INVENTION

The present invention relates to a gripping accessory which can be attached to portable electronic devices or cases for portable electronic devices and used as a handle and stand. The present invention further relates to a gripping accessory group, an accessory assembly and a method employing said gripping accessory.

BACKGROUND OF THE INVENTION

Portable electronic devices, such as MP3 players, tablets, and smartphones, are often housed in cases or protective cases to protect the device from damage, provide a grip for handling, and/or provide a support for resting the device on a surface.

Fixed or expandable gripping devices also exist, which can be attached directly to the device or the case protecting the device, and which are used for a variety of functions, such as resting the device on a surface or providing a stable grip for handling the device with fingers.

Inconveniently, the gripping devices of the prior art devices irremovably fixed to the case or electronic device are bulky and unhandy to carry in a pocket.

Additionally, the gripping devices of the prior art which are removably fixed to the cases or electronic devices, instead, suffer from the need to have specific mechanical fixing means which impact the size of the device but more importantly suffer from the impossibility to fix additional accessories in a simple manner.

Additionally, the gripping devices of the prior art fixed in a removable manner run the risk of being easily lost when they are disconnected from the case.

To overcome the aforementioned drawbacks of the prior art, a need is felt to make gripping accessories for portable electronic devices which are removable and at the same time provide convenience of use and allow further accessories to be used in a simple manner, without removing the main gripping accessory.

Furthermore, a need is also felt to make gripping accessories with reduced risk of being lost.

According to the present invention, such aims are achieved by a gripping accessory for a portable electronic device or case, a gripping accessory group, an accessory assembly and a method as described and claimed herein. Preferred embodiments of the present invention are also described.

The features and advantages of the gripping accessory, of the gripping accessory group, of the accessory assembly and the method will be apparent from the following description, given by way of non-limiting example, with reference to the accompanying figures.

DETAILED DESCRIPTION

Figure 1:
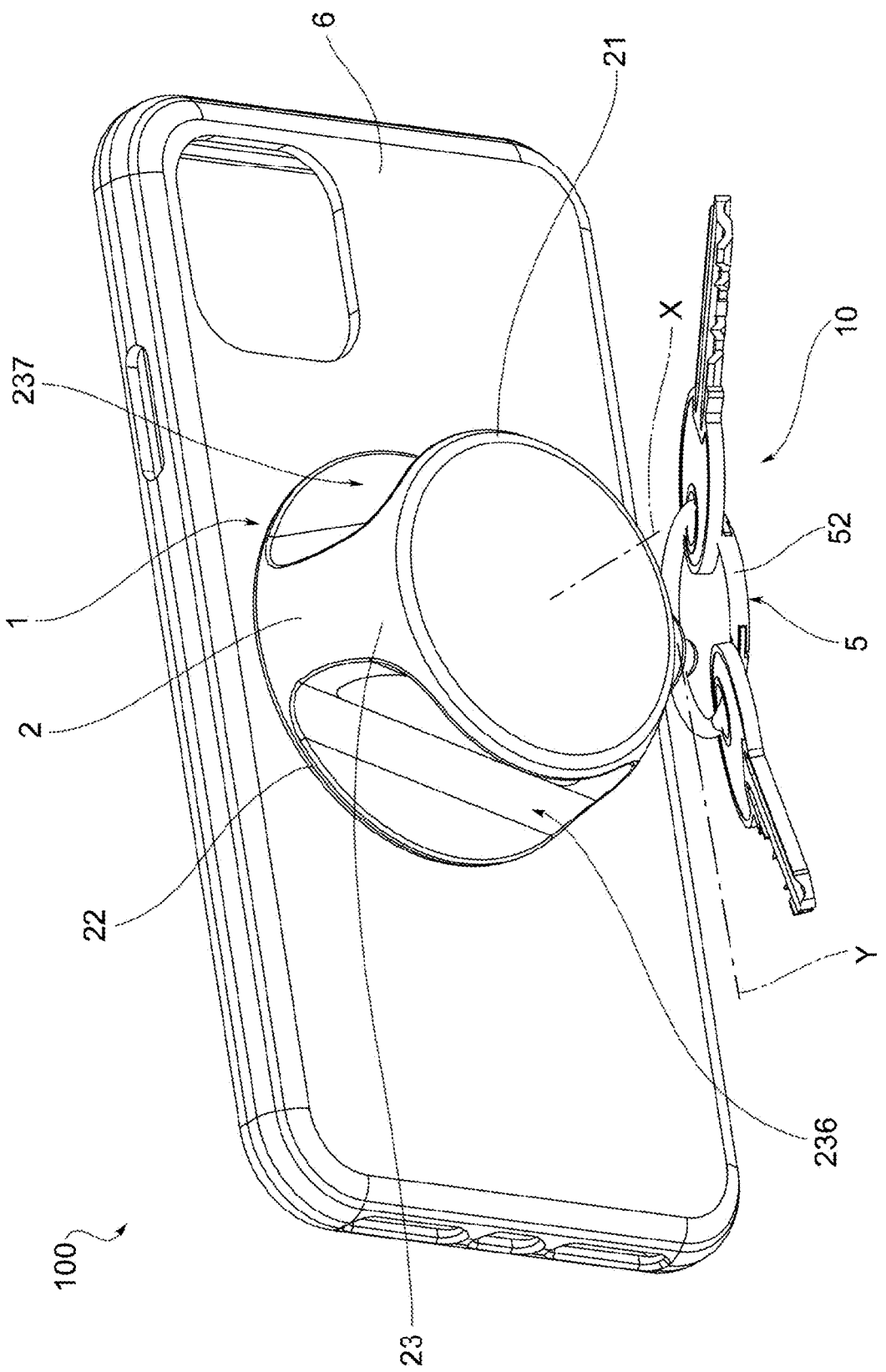
FIG. 1 shows a perspective axonometric view of an accessory assembly according to an embodiment of the present invention.

According to the accompanying figures, reference numeral 1 indicates as a whole a gripping accessory for a portable electronic device or for a case 6 of a portable electronic device, e.g. for a smartphone or a tablet or a similar device.

The gripping accessory 1 comprises a base body 2 comprising an upper surface 21 and a lower surface 22. The gripping accessory 1 extends between the lower surface 21 and the upper surface 22 around a longitudinal axis X and comprises a side wall 23 which extends between the upper surface 21 and the lower surface 22 around the longitudinal axis X. Preferably, the longitudinal axis X is perpendicular to the upper surface 21 and lower surface 22. The side wall 23 comprises a left housing 236 and a right housing 237. Each left housing 236 and right housing 237 is suitable for being grasped by a respective finger of a user's hand in a stable manner to support the portable electronic device when the gripping accessory 1 is coupled with the portable electronic device or the case 6.

Preferably, the base body 2 is made in a single body, preferably by injection molding of a plastic material.

The gripping accessory 1 further comprises a first magnetic element 3, preferably a permanent magnet, e.g. a Neodymium, Iron and Boron alloy magnet, joined to the base body 2 near the bottom surface 22, preferably just under the bottom surface 22, in the inward direction of the base body 2. The first magnetic element is suitable for generating a magnetic field to keep the lower surface 22 stably coupled with the portable electronic device or case 6.

The gripping accessory 1 further comprises a second magnetic element 4, different from the first magnetic element 3 and joined to the base body 2 near the side wall or the upper surface 21. The second magnetic element is suitable for generating a magnetic field suitable for coupling an auxiliary accessory, e.g. a key ring or another gripping accessory or an additional aesthetic accessory, e.g. a medal, an LED light or similar. The auxiliary accessory 5 either comprises or is made of a magnetic or ferromagnetic material, so as to magnetically couple with the second magnetic element.

According to an embodiment, the gripping accessory 1 comprises an accessory housing 231, obtained in the side wall 23 and in which the second magnetic element 4 is housed in a recessed manner with respect to an outer surface 232 of the side wall 23. Preferably, the second magnetic element is a permanent magnet either recessed, glued or embedded in the side wall 23.

According to a preferred embodiment, the first magnetic element 3 is a magnet of annular shape or annular shape with interrupted sectors or the like, preferably arranged around the longitudinal axis X.

According to an embodiment, both the first magnetic element 3 and the second magnetic element 4 are at least partially or fully embedded in the base body 2. If they are totally embedded in the base body 2, they are not visible from the outside.

According to an embodiment shown in the accompanying figures, the base body 2 is at least partially frustoconically shaped. In said embodiment, the upper surface 21 has a circular shape and corresponds to the minor base of the frustoconical shape and the lower surface 22 has a circular shape and corresponds to the major base of the frustoconical shape. Furthermore, the left housing 236 and the right housing 237 are respectively a left groove and a right groove arranged opposite to the left groove. Furthermore, the left and right grooves are obtained in the side wall 23 and are shaped to accommodate the fingers of a user's hand, e.g. by having an approximately "C"-shaped cross-section area. Preferably, said cross-section is to be understood to be a cross-section along a plane perpendicular to the lower surface 22 and passing through the longitudinal axis X. Preferably, the left and right grooves extend more along a direction parallel to the lower surface 22 and are arranged on the opposite side with respect to a plane passing through the vertical symmetry axis of the frustoconical shape and perpendicular to the lower surface.

A further object of the present invention is a gripping accessory group 10 which comprises the gripping accessory 1 and an auxiliary accessory 5 couplable in a magnetically releasable manner to the gripping accessory 1 at the second magnetic element 4.

According to an embodiment, the auxiliary accessory 5 comprises an auxiliary body 51 shaped by positive coupling with the accessory housing 231.

According to an embodiment, the auxiliary accessory 5 comprises an accessory body 51 and a keyring 52 passing through the accessory body 51 and rotatable relative to the accessory body 51 around a rotation axis Y.

Figure 2:
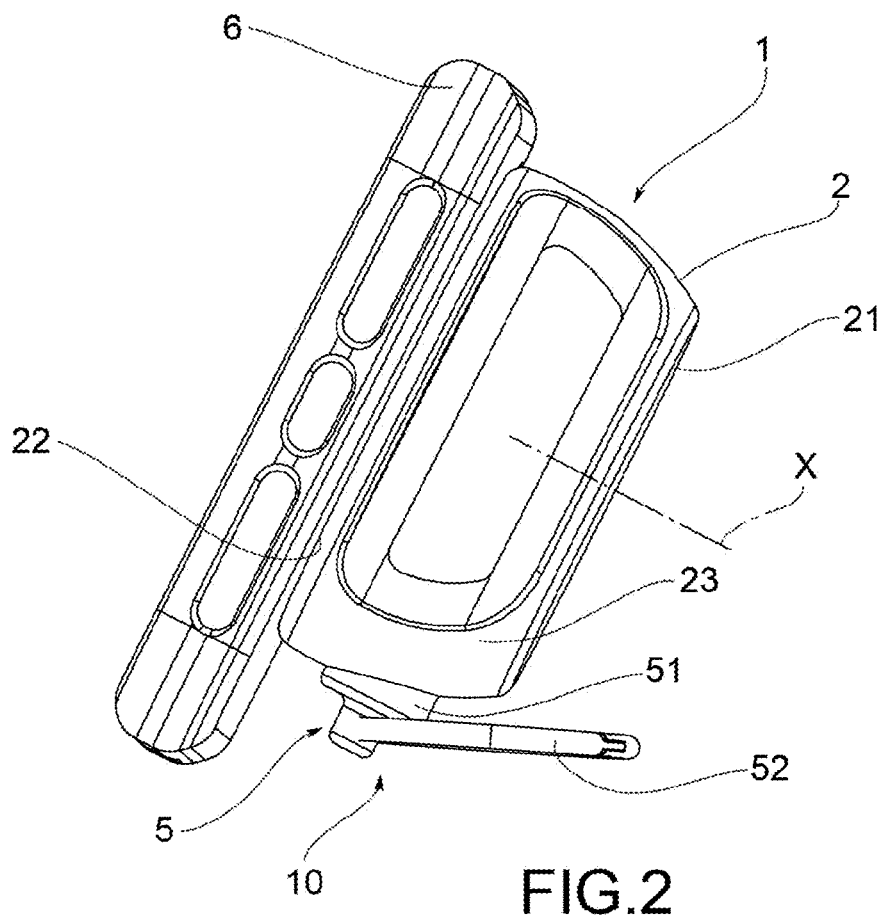
FIG. 2 shows a side view of the accessory assembly in FIG. 1.
Figure 3:
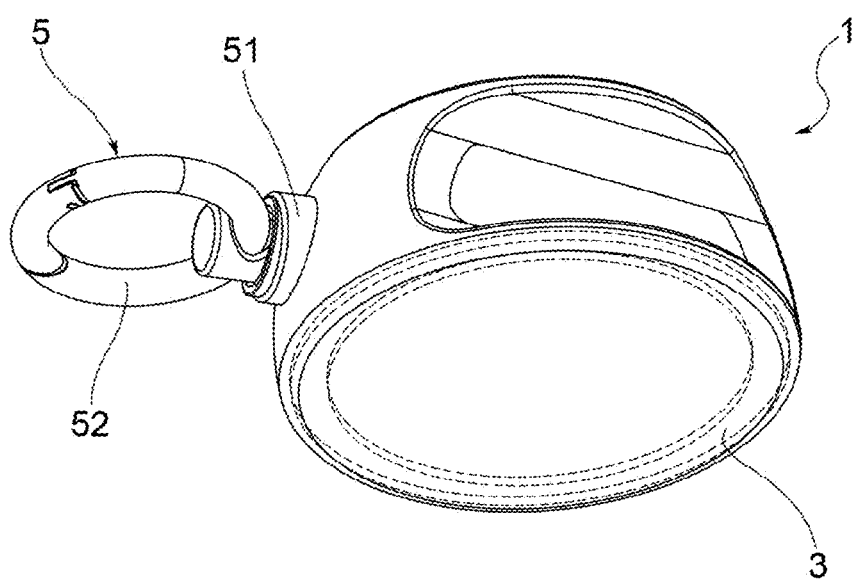
FIG. 3 is an axonometric view of a gripping accessory group, according to an embodiment of the present invention.
Figure 4:
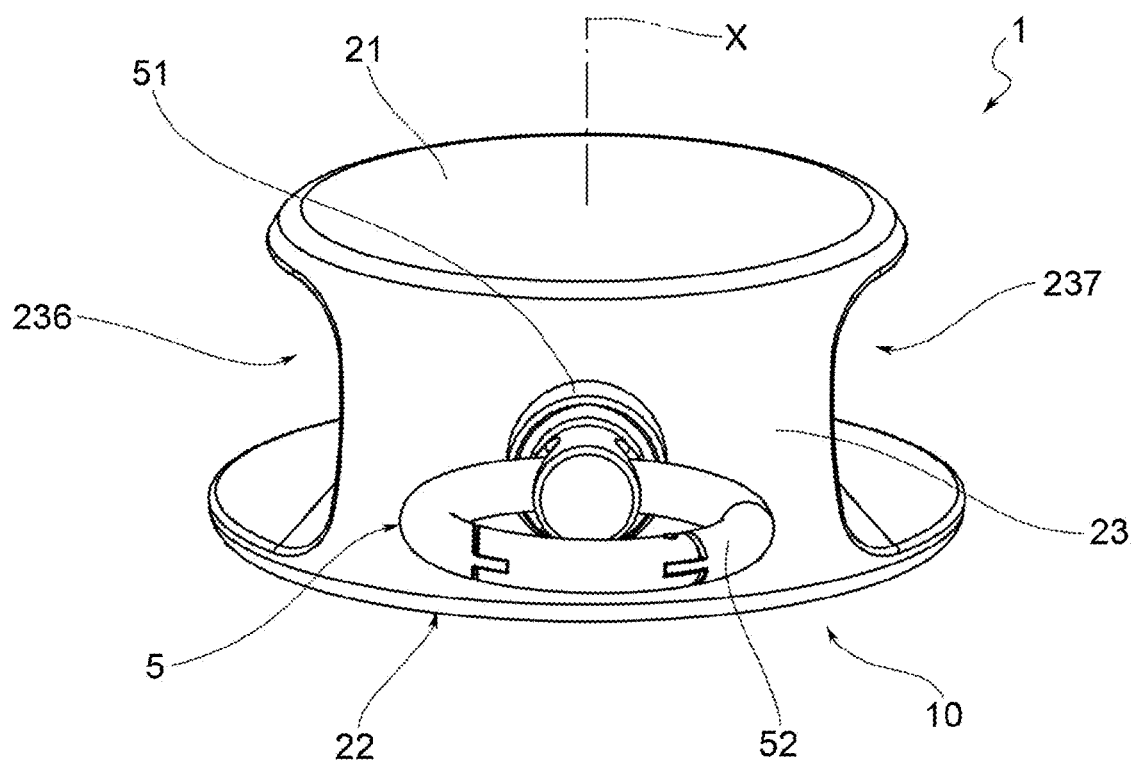
FIG. 4 is a front axonometric view of the gripping accessory group in FIG. 3.
Figure 5:
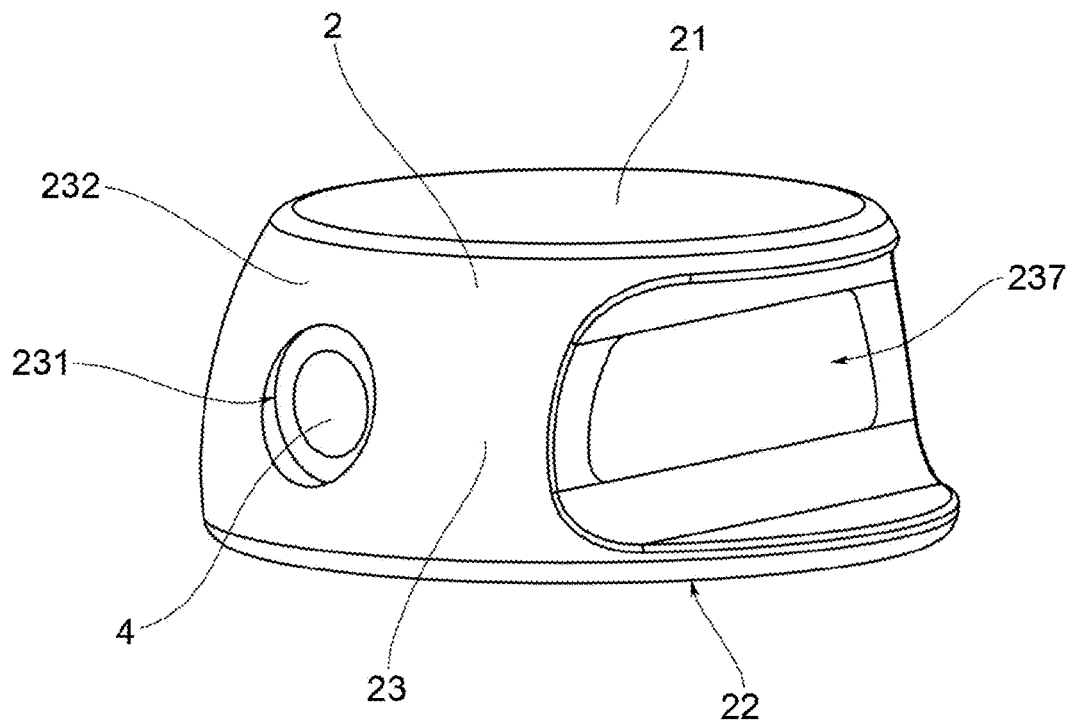
FIG. 5 shows an axonometric view of a gripping accessory according to an embodiment of the present invention.
Figure 6:
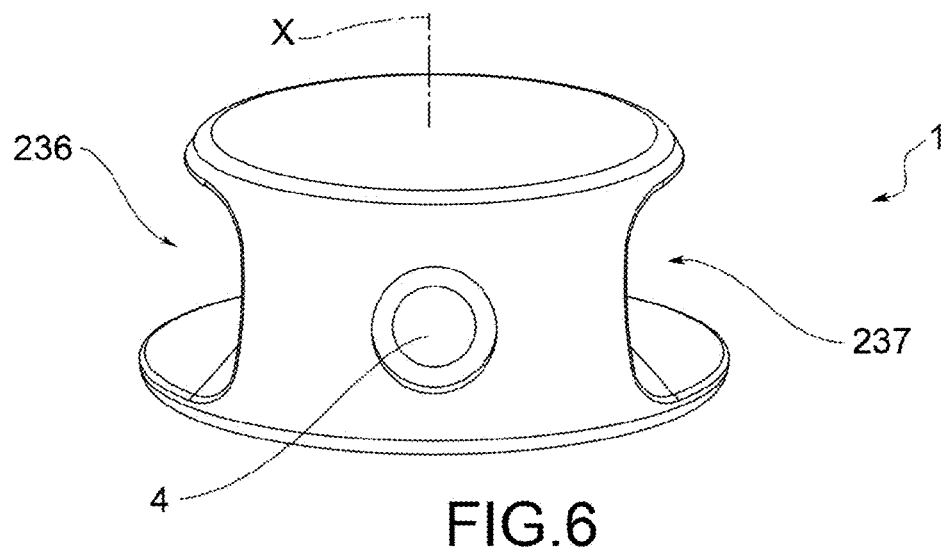
FIG. 6 shows a front axonometric view of the gripping accessory in FIG. 5.
Figure 7:
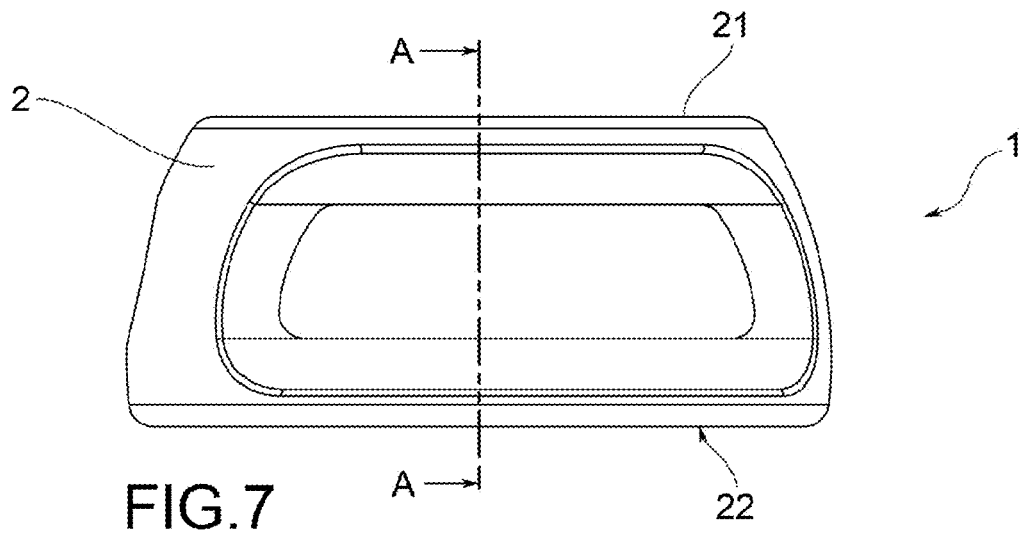
FIG. 7 is a side plan view of the gripping accessory in FIG. 5.
Figure 7A:
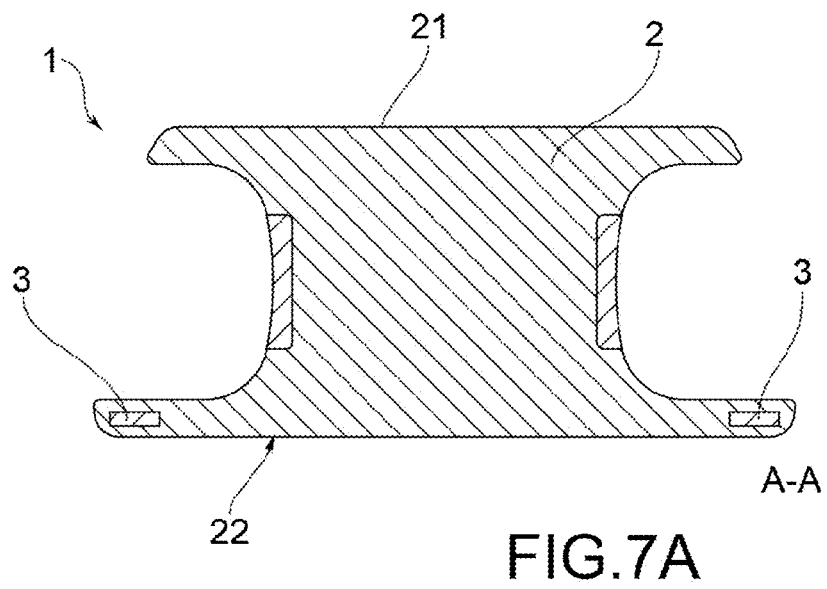
FIG. 7a is a section view of the gripping accessory in FIG. 7, taken along section plane A-A in FIG. 7.
Figure 8:
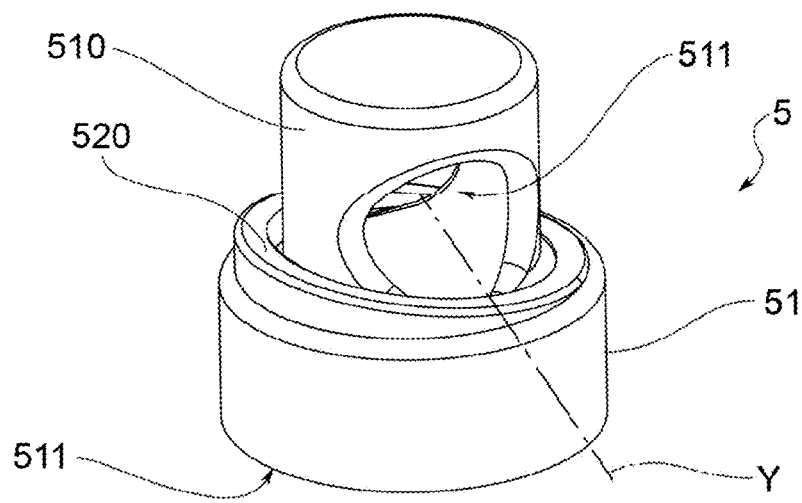
FIG. 8 shows an axonometric view of an auxiliary accessory, according to an embodiment of the present invention.
Figure 9:
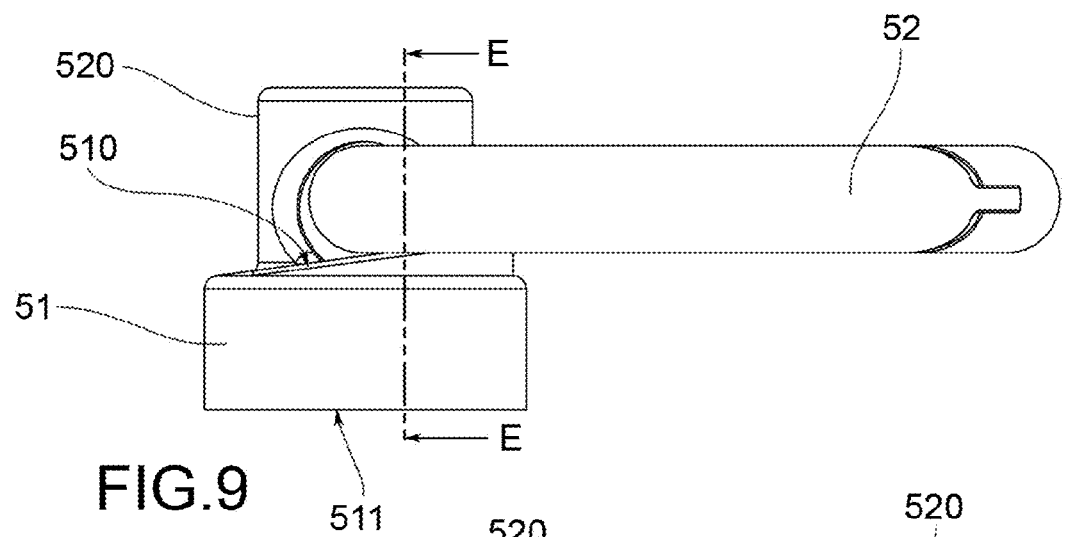
FIG. 9 is a side plan view of the auxiliary accessory in FIG. 8.
Figure 10:
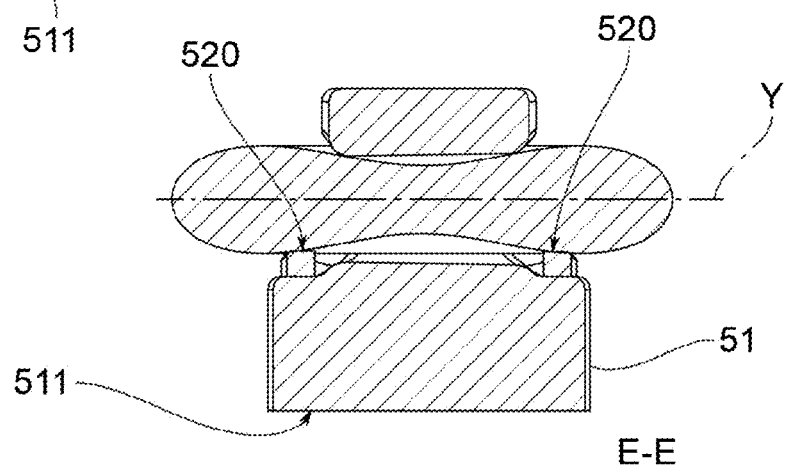
FIG. 10 shows a section of the auxiliary accessory of FIG. 9 taken along the section plate E-E in FIG. 9.

According to an embodiment, the accessory body 51 comprises a distal portion 510 in which a through-hole 511 is obtained into which the keyring 52 can be inserted in a rotatable manner around the rotation axis Y. In this variant, the accessory body 51 comprises a base surface 511 suitable for resting in the accessory housing 231 when the accessory body 51 is inserted in the accessory housing 231. Furthermore, the accessory body further comprises an abutment surface 520, inclined with respect to the base surface 511, to receive the keyring 52 in abutment and stop the rotation of said keyring 52 around the rotation axis Y, so that the keyring 52 can act as a stable support on a support surface and keep the portable electronic device or the case 6 resting on the support surface along a minor dimension thereof, i.e., either in "book stand" or "kickstand" mode, e.g. as shown in FIGS. 1, 2, 9 and 10.

According to an embodiment, the accessory housing 251 has a circular cross-section and the accessory body 51 has a cylindrical shape.

Preferably, the accessory body 51 is at least partially made of magnetic or ferromagnetic material, e.g. metal, or is completely made of magnetic or ferromagnetic material.

An additional object of the present invention is an accessory assembly 100 for a portable electronic device. The accessory assembly comprises the gripping accessory 1 or the accessory group 10 and a case 6 for a portable electronic device. The case 6 further comprises a magnetic element or a ferromagnetic housing element, adapted to receive the gripping accessory 1 in magnetic coupling.

A further object of the present invention is a method for connecting the gripping accessory group 10 to a portable electronic device or case 6. Such method comprises the following steps:
  magnetically coupling the auxiliary accessory 5 onto the base body 2;
  magnetically coupling the base body 2 to the portable electronic device or the case 6; and
  rotating the key ring 52 so that it abuts against the abutment surface 520 and rests on a supporting surface so that either the case 6 or the portable electronic device is held either in "book stand" or "kickstand" mode.

Innovatively, the gripping accessory of the present invention allows to synergistically combine the convenience and simplicity of a magnetic coupling to the case or portable electronic device together with the possibility of coupling auxiliary accessories easily and quickly to the previously magnetically coupled gripping accessory.

Advantageously, by virtue of the presence of a magnetically removable to keyring, there is a reduced risk of losing the accessory assembly when it is uncoupled from the case or mobile electronic device.

Further advantageously, by virtue of the presence of a lock to the rotation of the keyring, it is possible to use the electronic device simply and safely in "book stand" or "kickstand" mode, without the need for additional devices. Furthermore, by virtue of the inclined abutment surface, it is possible to obtain two inclinations of the mobile electronic device, according to whether the auxiliary accessory is coupled or not.

Furthermore, it is apparent that the gripping accessory group can also be used as a normal key ring allowing the users to have the gripping accessory always with them and not lose it.

It is apparent that a person skilled in the art may make changes to the invention described above, all of which are contained within the scope of protection as described and claimed herein in order to satisfy contingent needs.

What is claimed is:

1. A gripping accessory group comprising a gripping accessory for a portable electronic device or for a case of a portable electronic device, said gripping accessory comprising:
  a base body comprising an upper surface and a lower surface, said gripping accessory developing between said lower surface and upper surface around a longitudinal axis and further comprising a side wall extending between said upper surface and lower surface around said longitudinal axis, said side wall comprising a left housing and a right housing, the left housing and right housing being suitable for being stably grasped by a respective finger of a user's hand to support the portable electronic device when the gripping accessory is coupled with the portable electronic device or case, a first magnetic element, joined to the base body near the lower surface and suitable for generating a magnetic field to keep the lower surface stably coupled with the portable electronic device or case, and a second magnetic element, different from the first magnetic element, joined to the base body near the side wall or the upper surface, said second magnetic element being suitable for generating a magnetic field suitable for coupling an auxiliary accessory comprising magnetic or ferromagnetic material, said gripping accessory further comprising an accessory housing, obtained in the side wall and in which the second magnetic element is housed in a recessed manner with respect to an outer surface of the side wall, and an auxiliary accessory magnetically couplable in a releasable manner to the gripping accessory at the second magnetic element, wherein the auxiliary accessory comprises an accessory body and a keyring passing through the accessory body and rotatable with respect to the accessory body around a rotation axis and wherein the accessory body comprises a distal portion in which a through-hole is obtained, the keyring being rotatably insertable in said through-hole around the rotation axis, and wherein the accessory body comprises a base surface for resting in the accessory housing when the accessory body is inserted in the accessory housing and an abutment surface, inclined with respect to the base surface, to receive the keyring in abutment and stop rotation of said keyring around the rotation axis, so that the keyring acts as a stable support on a support surface to keep the portable electronic device or the case resting on the support surface along a minor dimension thereof, either in a book stand mode or a kickstand mode.

2. The gripping accessory group of claim 1, wherein the auxiliary accessory comprises an auxiliary body shaped by positive coupling with the accessory housing.

3. The gripping accessory group of claim 2, wherein the accessory housing has a circular cross-section and the accessory body has a cylindrical shape.

4. An accessory assembly for a portable electronic device, the accessory assembly comprising a gripping accessory group according to claim 1 and a case for a portable electronic device, said case comprising a magnetic housing element, suitable for receiving the gripping accessory group in magnetic coupling.

* * * * *